(12) United States Patent
Farooqi et al.

(10) Patent No.: US 10,235,594 B2
(45) Date of Patent: Mar. 19, 2019

(54) OBJECT DETECTION IN IMAGE DATA USING COLOR SEGMENTATION

(71) Applicant: SAP SE, Walldorf (DE)

(72) Inventors: Waqas Ahmad Farooqi, Walldorf (DE); Jonas Lipps, Walldorf (DE); Eckehard Schmidt, Walldorf (DE); Thomas Fricke, Alzey (DE); Nemrude Verzano, St. Leon-Rot (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/364,045

(22) Filed: Nov. 29, 2016

(65) Prior Publication Data

US 2018/0150716 A1    May 31, 2018

(51) Int. Cl.
| | | |
|---|---|---|
| *G06K 9/46* | (2006.01) | |
| *G06T 7/00* | (2017.01) | |
| *G06T 11/40* | (2006.01) | |
| *G06K 9/32* | (2006.01) | |
| *G06K 9/62* | (2006.01) | |

(52) U.S. Cl.
CPC ......... *G06K 9/4652* (2013.01); *G06K 9/3241* (2013.01); *G06K 9/6292* (2013.01); *G06T 7/0085* (2013.01); *G06T 11/40* (2013.01); *G06T 2207/10024* (2013.01); *G06T 2207/20024* (2013.01); *G06T 2207/20132* (2013.01); *G06T 2210/12* (2013.01)

(58) Field of Classification Search
CPC .. G06K 9/4652; G06K 9/6267; G06T 7/0085; G06T 11/40
See application file for complete search history.

(56) References Cited

U.S. PATENT DOCUMENTS

| | | | | |
|---|---|---|---|---|
| 6,404,920 B1 * | 6/2002 | Hsu | .................... | G06K 9/00201 382/190 |
| 2003/0235341 A1 * | 12/2003 | Gokturk | ............. | G06K 9/00228 382/243 |

OTHER PUBLICATIONS

Seul et al: Practical Algorithms for Image Analysis, Cambridge University press, 2000, pp. 122-123.*

* cited by examiner

*Primary Examiner* — Ruiping Li
(74) *Attorney, Agent, or Firm* — Jones Day

(57) ABSTRACT

Image color data for a field of view is received. Thereafter, color segmentation can be performed on the image color data to define at least one bounding polygon that minimizes an amount of free space within each bounding polygon. The at least one bounding polygon is then used to crop the image color data to result in cropped image color data. Image processing can then be applied to the cropped image color data to identify at least one object therein. Related apparatus, systems, techniques and articles are also described.

12 Claims, 9 Drawing Sheets

OBJECT DETECTION IN IMAGE DATA USING COLOR SEGMENTATION

TECHNICAL FIELD

The subject matter described herein relates to the localization of objects within image data using color segmentation to define bounding polygons around objects to facilitate further image processing.

BACKGROUND

Sensors are increasingly being adopted across multiple computing platforms (including standalone sensors for use in gaming platforms, mobile phones, etc.) to provide multi-dimensional image data (e.g., three dimensional data, etc.). Such image data is computationally analyzed to localize objects and, in some cases, to later identify or otherwise characterize such objects. However, both localization and identification of objects within multi-dimensional image data remains imprecise.

SUMMARY

In one aspect, image color data for a field of view is received. Thereafter, color segmentation can be performed on the image color data to define at least one bounding polygon that minimizes an amount of free space within each bounding polygon. The at least one bounding polygon is then used to crop the image color data to result in cropped image color data. Image processing can then be applied to the cropped image color data to identify at least one object therein.

A shape of the at least one bounding polygon can be rectangular. In addition or in the alternative, a shape of the at least one bounding polygon can have three or more sides.

Performing color segmentation can include cropping the image color data using the at least one bounding polygon to result in a cropped RGB image. In addition, color thresholding can be performed on the cropped RGB image to consolidate colors within pre-defined color ranges to result in a color threshold image. Edges can be defined for the color threshold image to result in an edge image. Any holes within an area encapsulated by the defined edges can be filled to result in a hole-filled edge image. At least a portion of the area encapsulated by the defined edges can be filled in the hole-filled edge image in black to generate a filled with black image. The filled with black image can be converted into a binary image comprising solely black and white pixels. The binary image can be inverted to result in a complementary binary image. Regions of pixels in the binary image having an area below a pre-defined threshold can be filtered out to result in a small regions filter image. The small regions filter image can be inverted and connected regions of pixels identified in the inverted small regions filter image having an area below a pre-defined threshold can be discarded to result in a discarded connected regions image. The discarded connected regions image can be inverted and the at least one bounding polygon can be formed around a biggest connected region within the inverted discarded connected regions image.

The image color data can be, for example, RGB data.

Performing color segmentation can include selectively inverting color images into binary images and binary images into color images.

Non-transitory computer program products (i.e., physically embodied computer program products) are also described that store instructions, which when executed by one or more data processors of one or more computing systems, cause at least one data processor to perform operations herein. Similarly, computer systems (including smart devices such as mobile phones, wearable devices (e.g., smart glasses, virtual reality headsets, augmented reality devices, etc.) and tablet computers, etc.) are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced object localization and object characterization within multi-dimensional image data such as RGB-D data, point clouds, and other image data obtained from sensors and CAD tools also including depth information.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for localizing (i.e., detecting, etc.) objects within multi-dimensional image data. Such multi-dimensional image data can, for example, be generated by an optical sensor that specifies both colors and depth information. In some cases, the multi-dimensional image data is RGB-D data, while in other cases, other types of multi-dimensional image data can be utilized including, without limitation, point cloud data. While the following is described primarily in connection with RGB-D image data, it will be appreciated that, unless otherwise specified, the current subject matter applies to other types of multi-dimensional image data (i.e., data that combines color and depth data/information) including video streams from a depth sensor/camera (which can be characterized as a series of RGB-D images).

Figure 1:
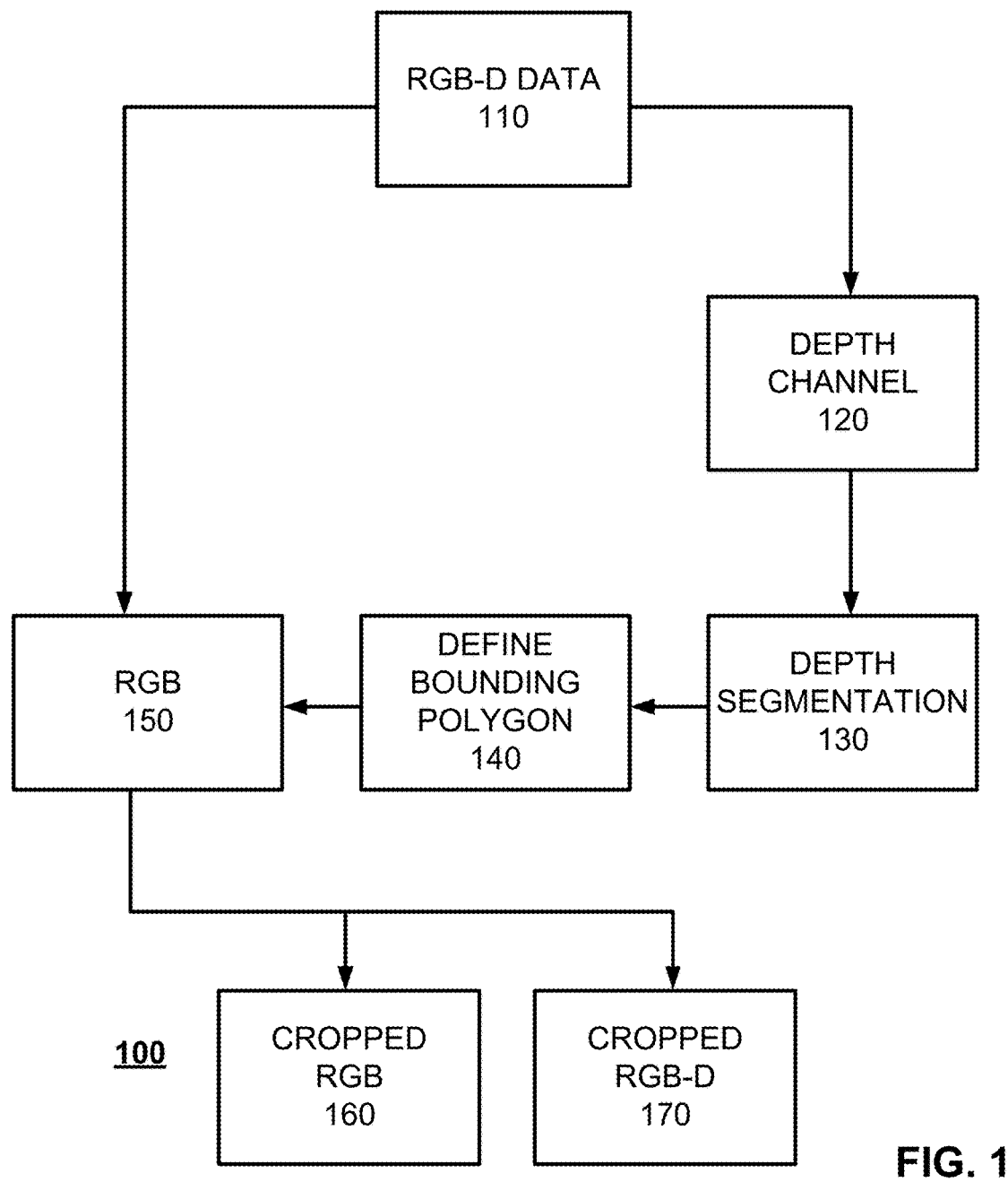
FIG. 1 is a process flow diagram illustrating cropping of an image using depth segmentation.

FIG. 1 is a process flow diagram 100 illustrating the generation of bounding boxes using depth data. Initially, at 110, RGB-D data is received (i.e., received from a remote computing system, accessed from a local data store, accessed from a remote database, accessed from a live video stream, derived from a series of sensors (e.g., 3-D cameras, infrared sensors, ultrasonic sensors, etc.), etc.). Such data can, for example, be generated or otherwise derived by an optical sensor positioned relative to a field of view that is capable, for example, of characterizing colors in two dimensions and optionally depth of pixels within the field of view. In some cases, multiple optical sensors can be utilized such that a first optical sensor provides color information and a second optical sensor provides depth data and the outputs of such sensors are combined to form RGB-D data (or other types of multi-dimensional image data). In other variations, there can be multiple optical sensors and the output of such sensors can be combined to provide a more expansive field of view than could otherwise be provided with a single optical sensor. The use of multiple sensors also improves the quality and the degree of detail for the obtained RGB-D data by combining different kind of sensors and cameras with different length of waves such as infrared, ultrasonic, and the like. It will also be appreciated that the field of view generated by the optical sensor(s) can be variable. Such variability can happen, for example, if the optical sensors are moving and/or are partially obscured. Example optical sensors can incorporate technologies such as the INTEL REALSENSE technology and/or MICROSOFT KINECT technology, among others, to provide the multi-dimensional image data. In addition, the multi-dimensional image data can be point clouds as well as other data obtained from sensors and CAD tools that include depth information.

After receipt of the RGB-D data, such RGB-D data can be bifurcated (i.e., split, etc.) into its separate components such that the color information (RGB) is separate and distinct from the depth information (D) to form two images respectively illustrating an RGB image 150 of the field of view and a depth channel image 120 of the field of view. The depth channel image 120 is then subjected to depth segmentation 130 (as will be described in further detail below) to identify one or more objects within the depth channel image 120 to result in at least one bounding polygon 140 being defined that, in turn, defines a perimeter around the identified object(s). This bounding polygon defines a series of connected coordinates that encapsulate an area within the corresponding image. This bounding polygon 140 can take many forms having three or more connecting sides. In some cases, the bounding polygons can be rectangles while, in other situations, requiring finer resolution and which potentially have greater computing resources, the bounding polygons can have more than four sides.

The defined bounding polygon 140 can then be applied to the RGB image 150 of the field of view to crop the RGB image (to form a cropped RGB image 160 and/or a cropped RGB-D image 170) which, in turn, can be used to localize the object(s) within such image. Various types of image processing can then be applied to the cropped RGB image 160 and/or cropped RGB-D image 170 including, for example, further localization techniques followed by object classification/characterization techniques. Such an arrangement is advantageous in that the bifurcation of the depth information from the color information and the use of the depth information for object localization (via the definition of bounding polygons) provides greater localization/identification accuracy of objects than if the combined color/depth image data were to be used. It will be appreciated that variations to the segmentation techniques herein can be provided such as blobbing on the result and the like.

Figure 2:
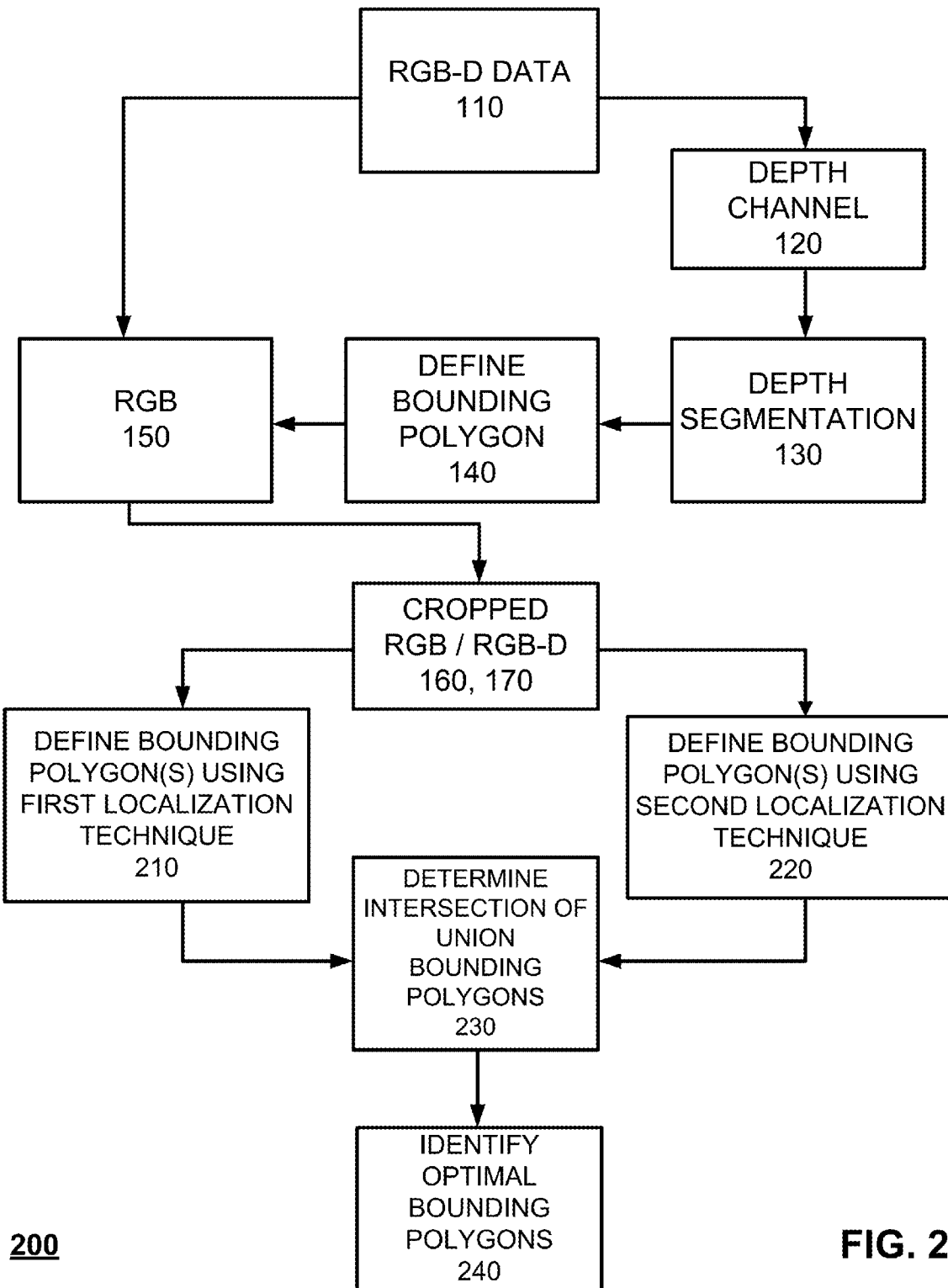
FIG. 2 is a process flow diagram illustrating generation of a proposed bounding polygon using two or more object localization techniques.

FIG. 2 is a process flow diagram 200 that illustrates a variation of FIG. 1 in which the cropped RGB image 160 is subject to further processing. It will be appreciated that with the example of FIG. 2, similar processes can be applied to the RGB-D image 170 and the example uses only RGB image data 160 to simplify the explanation. Similar to with FIG. 1, RGB-D data is received 110 and then bifurcated into an RGB image 150 and a depth channel image 120 so that depth segmentation 130 can be applied to the depth channel image 120. This depth segmentation 130 is used to define bounding polygons 140 are then subsequently applied to the RGB image 150 so that the RGB image 150 can be made into a cropped RGB image 160.

Continuing with FIG. 2, the cropped RGB image 160 is processed using a first object localization technique 210 to identify a first set of proposed bounding polygons identifying objects within the cropped RGB image 160. In addition, in parallel, the cropped RGB image 160 is also processed using a second, different object localization technique 220 to identify a second set of proposed bounding polygons identifying objects within the cropped RGB image 160. Various types of region proposal/object localization techniques can be utilized including edge model techniques, color segmentation (as described herein), SelectiveSearch, BING, CPMC, Endres, geodesic, MCG, Objectness, Rahtu, ramdomized prism, Rantalankila, Gaussian, SlidingWindow, Superpixels, uniform, and the like.

In some cases, more than two object localization techniques can be used. Further, in some variations, the object localization techniques can be performed in sequence and/or partially in parallel. The first and second set of proposed bounding polygons (in some cases only one bounding polygon is identified by one of the localization techniques) are then analyzed to determine an intersection of union or other overlap across the first and second sets of proposed bounding polygons 230. Based on this determination, at least one optimal bounding polygon 240 is determined. This optimal bounding polygon 240 can then be used for subsequent image processing including classification of any encapsulated objects within the optimal bounding polygon 240 as applied to the cropped RGB image 160.

Figure 3:
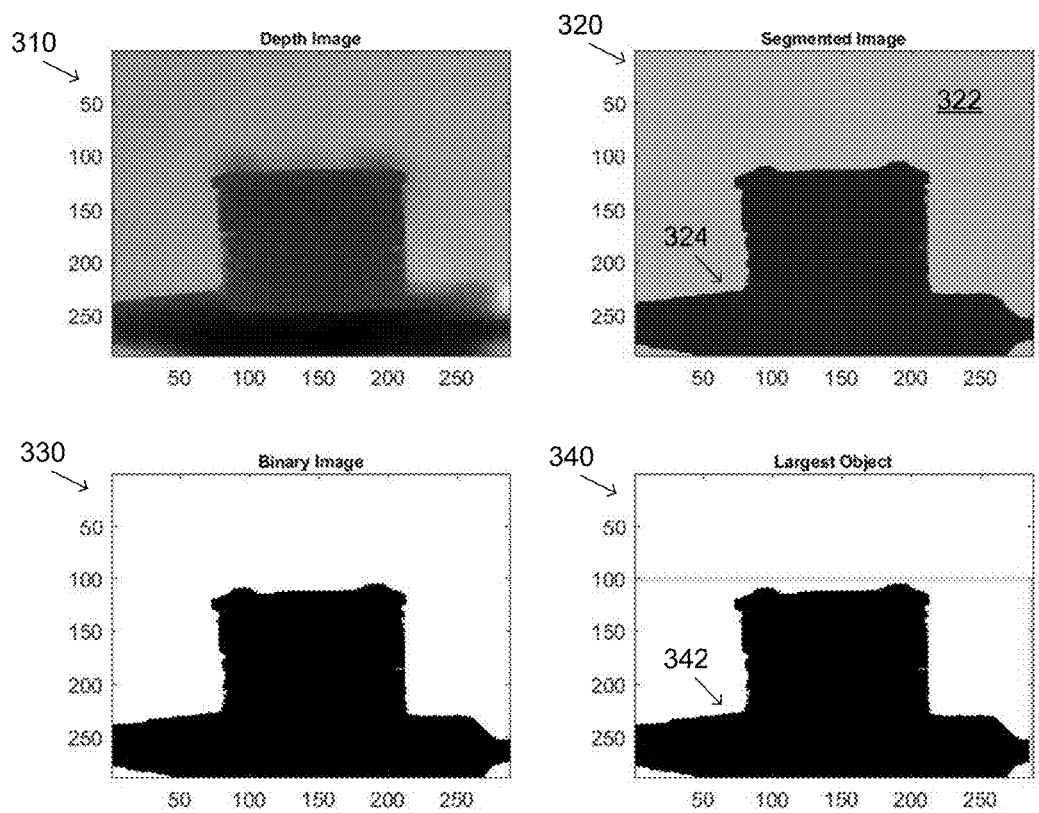
FIG. 3 includes illustrations showing depth segmentation for use in object localization.

As mentioned above, depth segmentation 130 can take the depth channel image 120 and define bounding polygons 140 using the depth information without the benefit of the RGB information. Diagram 300 of FIG. 3 illustrates one type of depth segmentation that utilizes a depth channel image 310 that has been generated from a multi-dimensional data image. The depth channel image 310 is initially segmented to generate a segmented image 320. This segmentation is performed, for example, by grouping all pixels having similar depth values (i.e., depth values within a pre-defined range of values relative to one another) into one of two or more groups. In the example of segmented image 320, the groups include a foreground portion 324 and a background portion 322. Once these groups 322, 324 are defined in the segmented image 320, a binary of the segmented image 324 can be generated to result in a binary image 330 (which as illustrated includes only a foreground object). As is illustrated in image 340, a bounding polygon 342 can then be generated that encapsulates the foreground object. The image data encapsulated by the various edges of the bounding polygon 342 can then be subjected to further image processing including, without limitation, classification of the objects.

Figure 4:
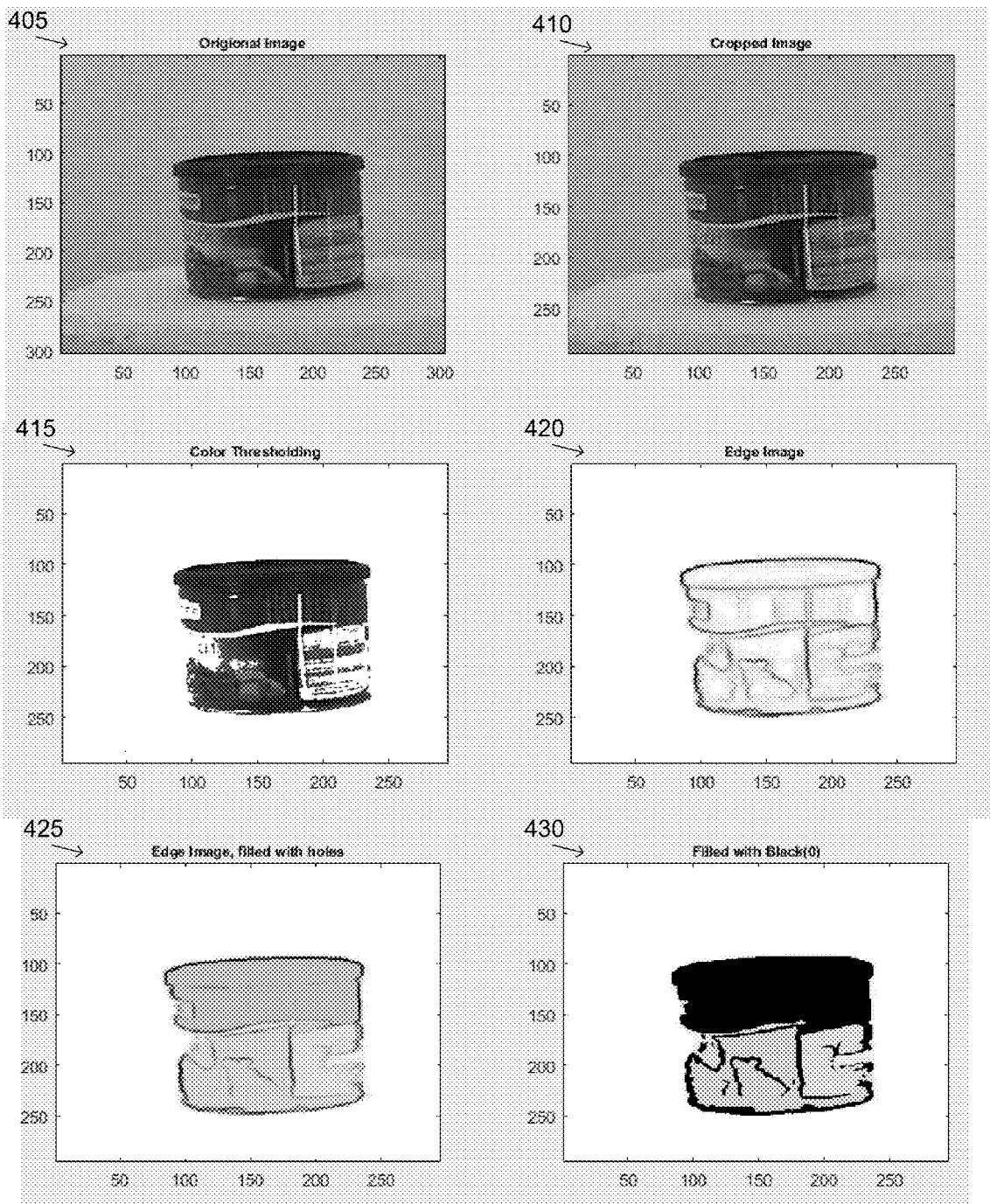
FIG. 4 includes illustrations showing first aspects of color segmentation for use in object localization.
Figure 5:
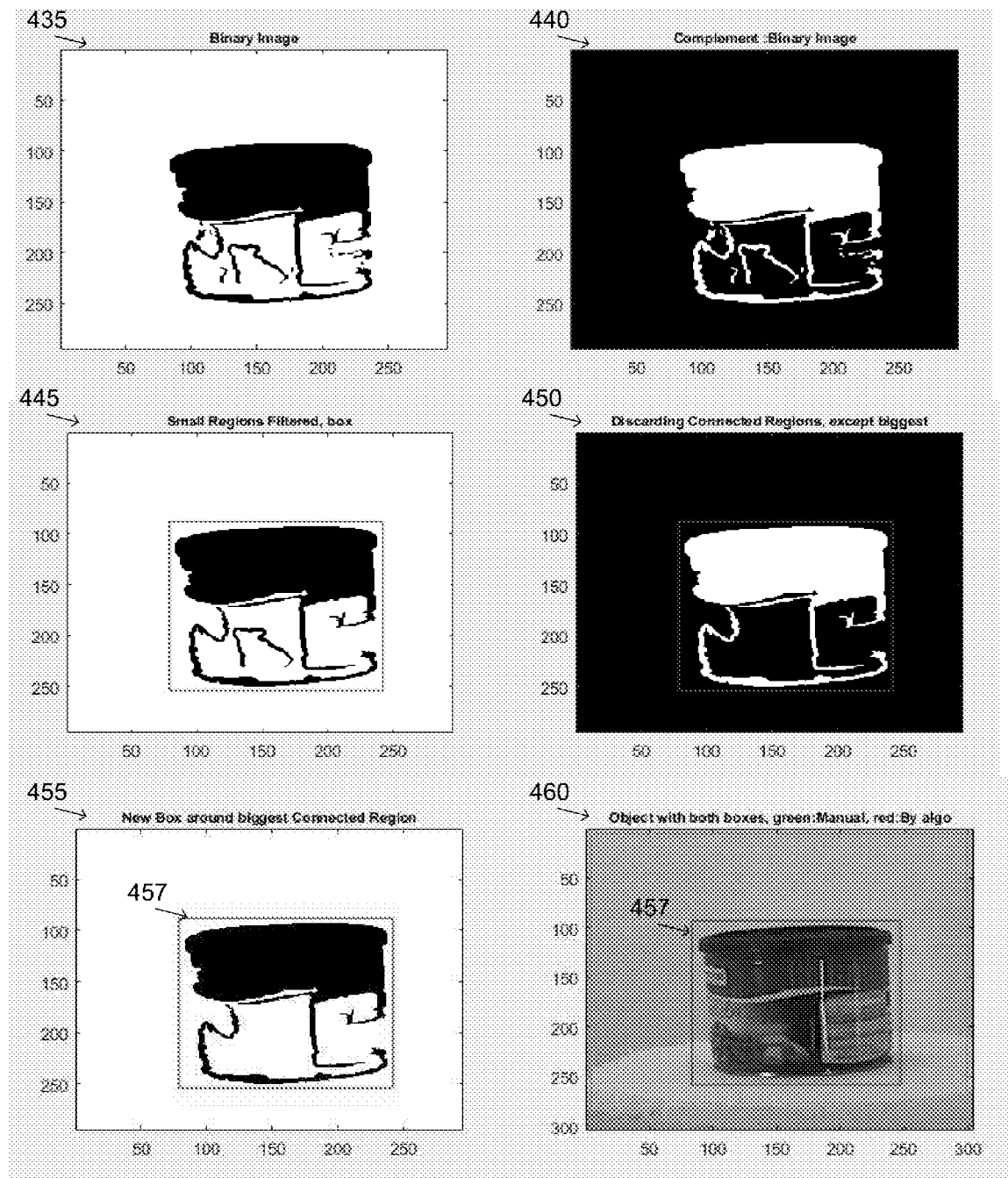
FIG. 5 includes illustrations showing second aspects of color segmentation for use in object localization.

As mentioned above, other types of object localization techniques can be used in connection with the depth segmentation provided herein. In some cases, such as with color segmentation, these object localization techniques can also be used standalone. With reference to the diagrams 400, 500 of FIGS. 4-5, a series of images are provided which illustrate color segmentation as provided herein. Color segmentation is provided herein as an example type of localization/image cropping and, unless otherwise specified, is intended to be one of numerous techniques that can be utilized. Initially, an original image 405 (which can be a two dimensional RGB image or a multi-dimensional image, etc.) is provided that is subsequently cropped 410. This cropping can be based on an object identification or other techniques to reduce the amount of pixels/data data that is separate from the object (i.e., portions of the image that are clearly not part of the object are removed, etc.). In some cases, the cropped image 410 can be provided using a technique such as that described in connection with FIG. 1.

Color thresholding can be performed on the cropped image 410 to result in a color thresholded image 415. This color thresholding groups together pixels having colors within pre-defined bands so that the overall number of colors are reduced. The color thresholded image 415 can later be subject to edge modeling which results in an edge image 420 that identifies possible edges of the object of interest. Holes of the edge image 420 can then be filled (i.e., areas surrounded on at least two sides by pixels of a common band can be modified to be common with the nearest pixel grouping, etc.) to form a hole-filled edge image 425. The hole-filled edge image 425 can then be filled with black to result in a black-filled edge image 430. The black-filled edge image 430 can then be converted into a binary image 435 which, in turn, can be converted into a complementary binary image 440. Small regions of the binary image 435 can then be discarded and an initial bounding polygon (in this case a box) can encapsulate the object to result in a small regions filtered, box image 445. The complement of the small regions, filter box 445 can be modified to discard connected regions having a size below a pre-defined threshold to result in a discarded connected regions image 450. An inverse 455 of the discarded connected regions image 450 can then be modified to have a new box around a largest connected region to specify a final bounding polygon 457. This final bounding polygon 457 can then be applied to the original image 460 so that subsequent imaging processing can be performed on the portion of the image within the final bounding polygon 457 (i.e., object classification, etc.).

Figure 6:
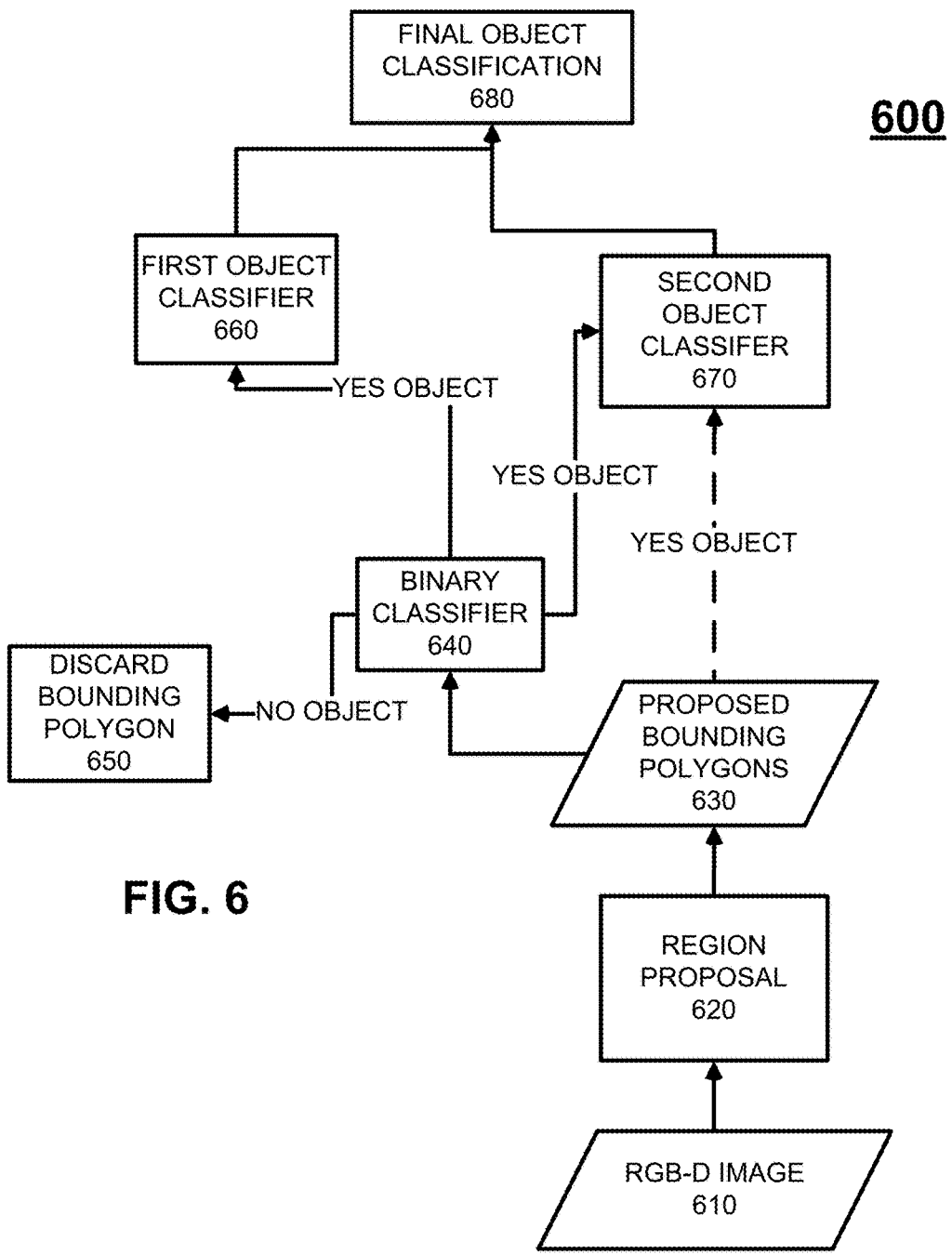
FIG. 6 is a process flow diagram illustrating the classification of objects within bounding polygons using a combination of a binary classifier and two or more multi-class classifiers.

FIG. 6 is a process flow diagram 600 illustrating a technique for the classification of objects within RGB-D image data 610. Initially, regions 620 are proposed within the RGB-D image data 610 that likely contain objects of interest. These regions can be proposed, for example, by cropping the RGB image as described in connection with FIG. 1. Other types of region proposal technologies can be used as described above. Within the proposed regions, various types of bounding polygons can be proposed, at 630, using, for example, depth segmentation, color segmentation, edge models, or other techniques for generating bounding polygons.

The proposed bounding polygons 630 are then submitted to a binary classifier 640 which is used to make a determination of whether or not each proposed bounding polygon encapsulates an object. The binary classifier 640 does not provide an identification or other classification of what is encapsulated within the respective proposed bounding polygon, but rather, it provides a binary determination of whether or not there is an object encapsulated therein. In some cases, the binary classifier 640 can use metadata characterizing the image/object to make its determination. If the binary classifier 640 determines that there is no object encapsulated within the respective bounding polygon, the proposed bounding polygon is discarded (650). Otherwise, information characterizing the respective bounding polygon is sent to both of a first object classifier 660 and a second object classifier 670. Both of these classifiers 660, 670 make a determination of what type of object is encapsulated within the respective bounding polygon (the bounding polygon is no longer proposed as the binary classifier 640 already determined that an object is encapsulated therein). These determinations are then provided to a final object classification module 680 which then selects among the competing determinations a final object that is encapsulated within the respective bounding polygon. Information characterizing this final object can then be provided in some fashion including, for example, stored in a physical persistence, loaded into memory, transmitted to a remote computing system, and/or displayed on an electronic visual display device.

The binary classifier 640 can utilize one or more machine learning models in its determination of whether or not a proposed bounding polygon encapsulates an object. This determination can be open-ended in that it relates to any objects at all or it can be limited to a defined set of objects (i.e., known objects or known object types). With the latter example, for example, if the current subject matter is used in connection with inventorying within a warehouse, the defined set of objects could relate to packages of goods such that other items such as humans, forklifts, shelves, lighting fixtures, and the like can be discarded if within present within a proposed bounding polygon.

The binary classifier 640 can use, for example, at least one machine learning model trained with historical data that can optionally characterize known objects. The machine learning model utilized by the binary classifier 640 can be one or more of: a neural network (e.g., a convolutional neural network, a region and measurements-based convolutional neural network, etc.), a logistic regression model, a support vector machine, decision trees, ensembles (bagging, boosting, random forest, etc.), k-nearest neighbors, linear regression, naïve Bayes, logistic regression, perceptron as well as other machine learning models. As part of the training of such machine learning models, features are established for image data which are then extracted from the historical image data to facilitate future predictions/determinations using the binary classifier 640. In some cases, the binary classifier 640 utilizes the depth information in the RGB-D data as one of the features used in both training the machine learning model and in determining whether a proposed bounding polygon encapsulates an object. The binary classifier 640, when receiving data characterizing a proposed bounding polygon, extracts pre-defined features from such data and inputs such data into the at least one machine learning model to make the determination of whether or not the proposed bounding polygon encapsulates an object.

The first object classifier 660 can also utilize at least one machine learning model. The machine learning model utilized by the first object classifier 660 can be one or more of: a neural network (e.g., a convolutional neural network, etc.), a logistic regression model, a support vector machine, decision trees, ensembles (bagging, boosting, random forest, etc.), k-nearest neighbors, linear regression, naïve Bayes, logistic regression, perceptron as well as other machine learning models. As part of the training of such machine learning models, features are established for image data which are then extracted from the historical image data to facilitate future predictions/determinations using the first object classifier 660. In contrast to the binary classifier 640, the first object classifier 660 is a multi-class classifier that provides a characterization of an object encapsulated within a bounding polygon.

The first object classifier 660 extracts features from the image data which can, for example, include metadata characterizing the image. In some cases, the metadata is included as part of the image data while, in other implementations, the metadata can be stored separately (or derived separately from the optical sensor(s) that generated the image data). For example, the metadata can include measurements of an object within the bounding polygon such as, for example, length, height, depth, world-coordinates (3-D coordinates), average color, size and shape, time of day of image capture, and the like.

Figure 7A:
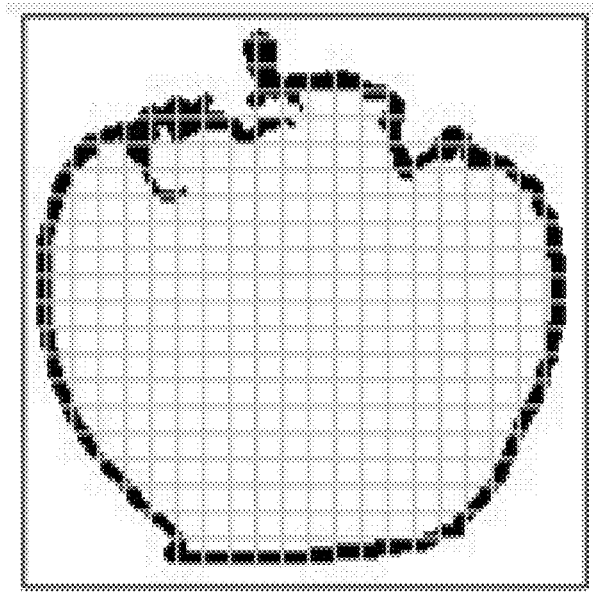
FIGS. 7A and 7B are illustrations showing the derivation of metadata from image data.
Figure 7B:
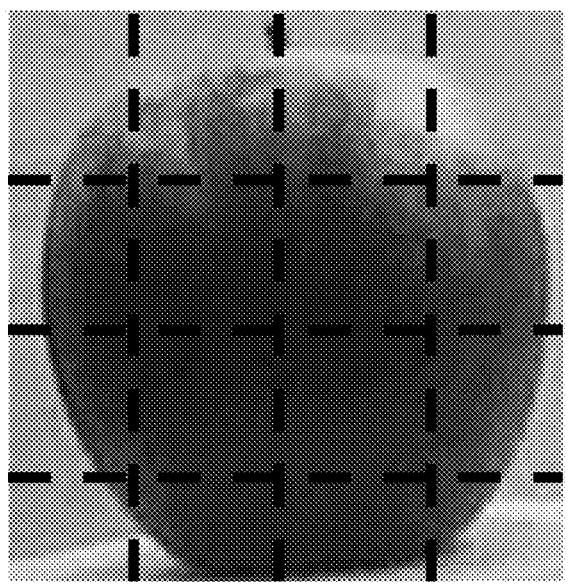

FIGS. 7A and 7B illustrate how some of such metadata can be generated. With reference to 700A, an apple is pictured within a proposed grid point mask (e.g., 20×20, etc.) for measurements. This grid point mask can be applied to a cropped binary image so that the length and height can be calculated using the grid points and the three dimensional coordinates for these grid points can be determined. From the different values within each cell of the grid point mask, the top number of values above a pre-defined threshold (e.g., 16 in the case of a 20×20 grid point mask) can be characterized as having high confidence (which can help avoid measurement errors from sensors due to factor such as noise and the like). With these calculations, the shape of the object can be characterized.

With reference to illustration 700B of FIG. 7B, to determine average color (which will form part of the metadata), the cropped image can be subdivided (in this case into a 4×4 matrix). At each cell, an average color can be computed.

In one approach, all features forming part of the metadata can be arranged into a row vector. A support vector machine can then be applied to train and test the underlying model. In a different approach, LDA can be applied to convert the data [e.g., N×48] to a lower dimensional space of [N×M], where (i) N=no. of samples, and (ii) M=targeted dimensional space for decision boundaries (e.g., 2). The support vector machine can then be applied to train and test the underlying model.

The second object classifier 670 can also utilize at least one machine learning model. The machine learning model utilized by the second object classifier 670 can be one or more of: a neural network (e.g., a convolutional neural network, etc.), a logistic regression model, a support vector machine, decision trees, ensembles (bagging, boosting, random forest, etc.), k-nearest neighbors, linear regression, naïve Bayes, logistic regression, perceptron as well as other machine learning models. As part of the training of such machine learning models, features are established for image data which are then extracted from the historical image data to facilitate future predictions/determinations using the second object classifier 670. Similar to the first object classifier 660, the second object classifier 670 is a multi-class classifier that provides a characterization of an object encapsulated within a bounding polygon.

The second object classifier 670 can also extract features from data characterizing a proposed bounding polygon for input into the one or more machine learning models to identify the respective object within the bounding polygon. The features extracted by the second object classifier 670 can vary from that extracted by the first object classifier 660. For example, the second object classifier 670 may not necessarily utilize the metadata.

The feature extraction, by the second object classifier 670, can, for example, use a bag-of-word (BoW) model that treats image features as words. As part of the BoW model, the features can be detected, represented in vectors as feature descriptors based on a learning visual vocabulary, and a codebook can be generated by converting all of the vectors to codewords (using, for example, k-means clustering). This codebook can be used to represent the image as a histogram as the codewords. The codebook and/or the codewords can, for example, be utilized by a support vector machine or other machine learning model to make the determination of which object is included within the respective bounding polygon.

In some variations, one or both of the first object classifier 660 and the second object classifier 670 can use a series of machine learning models that are each trained towards characterizing/identifying different types of objects. For example, a first machine learning model can be trained to classify small objects, a second machine learning model can be trained to classify large objects, a third machine learning model can be trained to classify spherical objects, and a fourth machine learning model can be trained to classify rectangular objects, a fifth machine learning model can be trained to classify humans, a sixth machine learning model can be trained to classify animals and so on. In some cases, the extracted features and/or the metadata can be used to determine which of the various machine learning models can be utilized in connection with the classification. In this case it will be derived from the meta data which of these models (could be several in parallel processing) are triggered. The meta data is used here as pre-classification and reduces the n class problem to an easier problem because each machine learning model is only responsible for a subset of these n classes.

The final object classification module 680 can receive scores or other measures (e.g., confidence measures) from the first object classifier 660 and the second object classifier 670 that indicate a likelihood of the objects identified by the respective object classifier 660, 670. The final object classification module 680 uses such scores/measures when selecting a final object. For example, the object having the highest score can be selected as the final object (regardless of which of the object classifiers 660, 670 identified such object). Other selection techniques can be utilized such as using a weighted sum of multiple scores.

Figure 8:
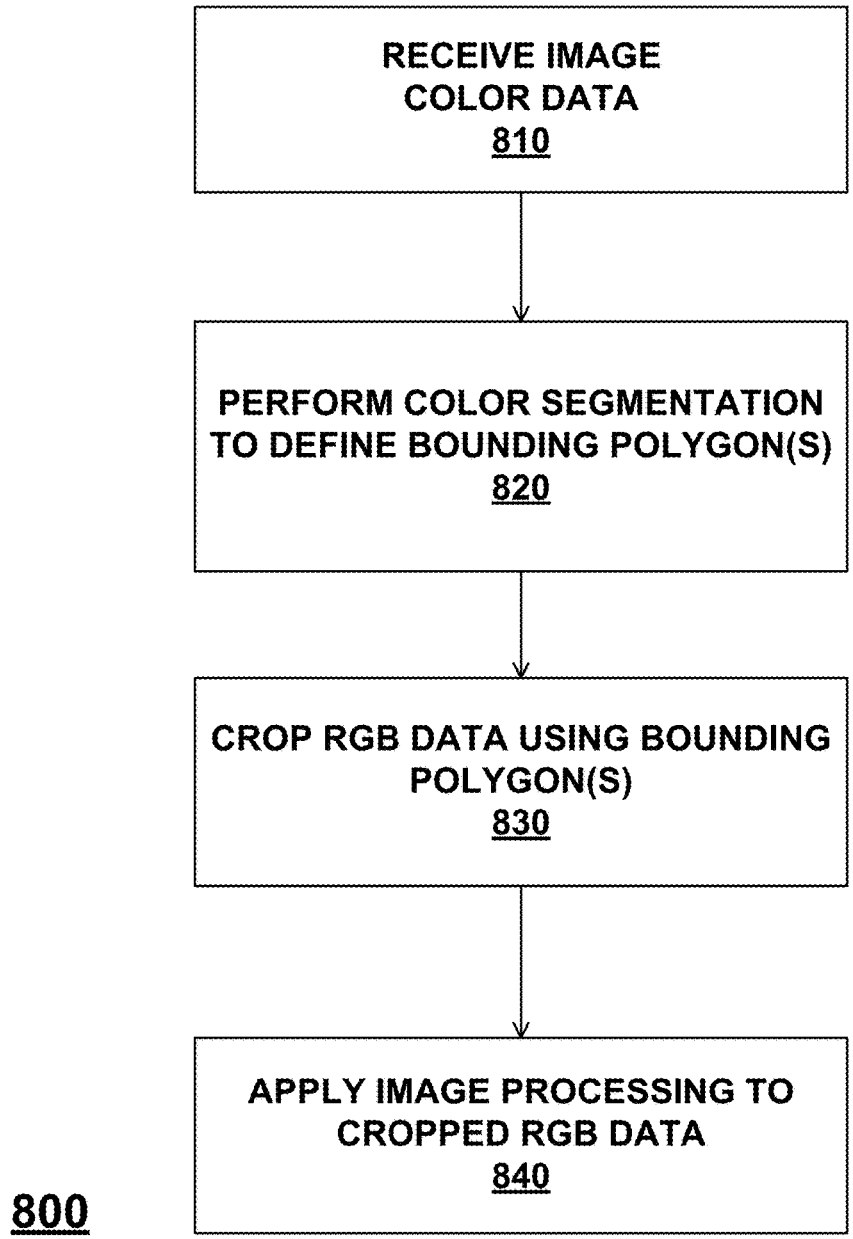
FIG. 8 is a process flow diagram illustrating object detection in image data using color segmentation.

FIG. 8 is a diagram 800 in which, at 810, image color data for a field of view is received. Thereafter, at 820, color segmentation can be performed on the image color data to define at least one bounding polygon that minimizes an amount of free space within each bounding polygon. The at least one bounding polygon is then, at 830, used to crop the image color data to result in cropped image color data. Image processing can then be applied to the cropped image color data, at 840, to identify at least one object therein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. Aspects of the current subject matter can be implemented by a variety of computing systems including, without limitation, desktop, laptop and tablet computers, as well as IoT devices, wearable devices (e.g., smart glasses, virtual reality headsets, augmented reality devices, etc.) and mobile phones. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 9:
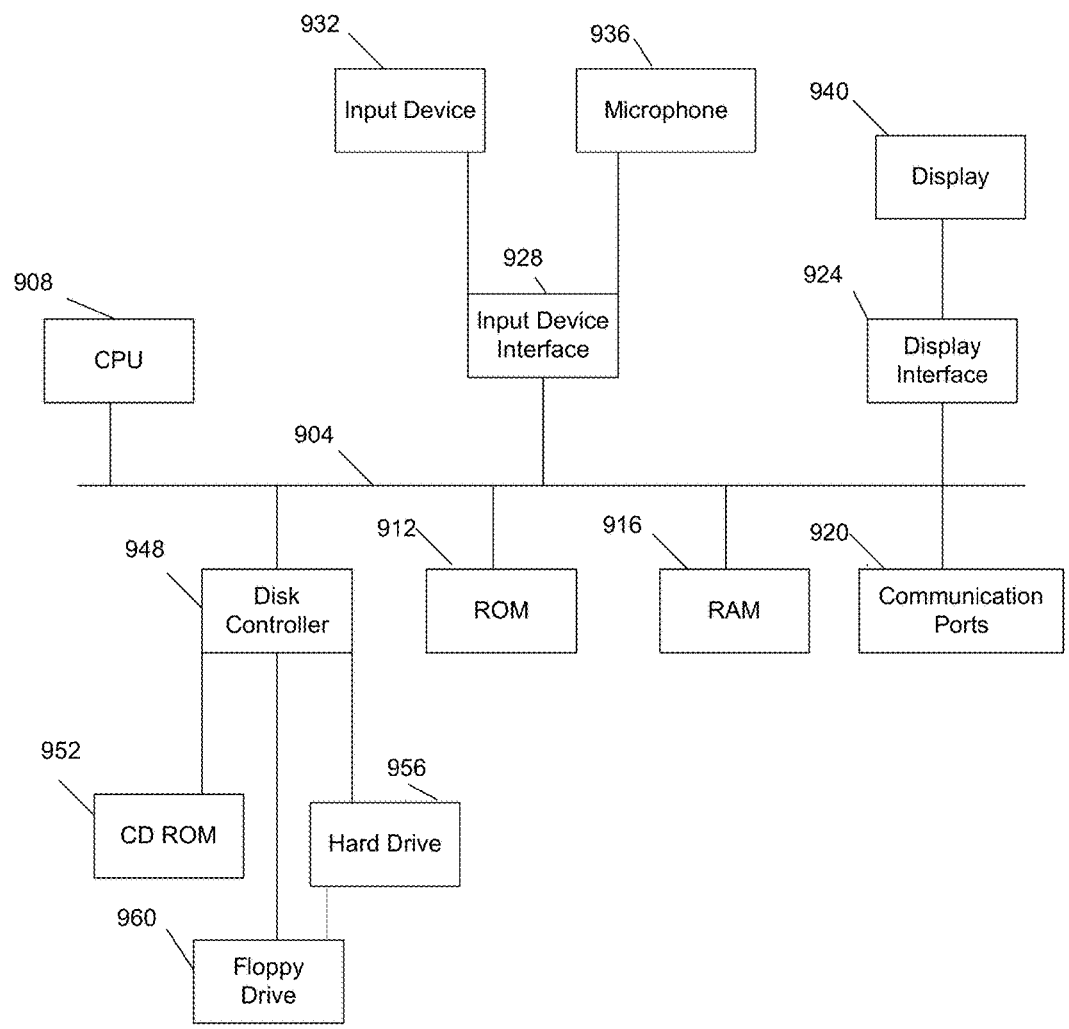
FIG. 9 is a computing device for implementing aspects described herein.

FIG. 9 is a diagram illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916 can be in communication with the processing system 908 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives may be external or internal disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 to the user and an input device 932 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 936, or tactile feedback); and input from the user may be received in any form, including acoustic, speech, or tactile input. In the input device 932 and the microphone 936 can be coupled to and convey information via the bus 904 by way of an input device interface 928. Other computing devices, such as dedicated servers, can omit one or more of the display 940 and display interface 924, the input device 932, the microphone 936, and input device interface 928.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for enhanced object localization and object characterization within multi-dimensional image data, the method being implemented by one or more data processors forming part of at least one computing device and comprising:
   receiving multi-dimensional, digital image color data for a field of view;
   performing color segmentation on the image color data to define at least one bounding polygon that minimizes an amount of free space within each bounding polygon, the color segmentation comprising a sequence including converting color images within the image color data into binary images, selectively inverting the binary images, and converting the binary images back into color images;
   cropping using the at least one bounding polygon, the image color data to result in cropped image color data; and
   applying image processing to the cropped image color data to identify at least one object therein;
   wherein:
      selectively inverting the binary images comprises generating a discarded connected regions image and inverting the discarded connected regions image;
      the at least one bounding polygon is formed around a biggest connected region within the inverted discarded connected regions image; and
      the performing color segmentation comprises:
         cropping the image color data using the at least one bounding polygon to result in a cropped RGB image;
         performing color thresholding on the cropped RGB image to consolidate colors within pre-defined color ranges to result in a color threshold image;
         defining edges for the color threshold image to result in an edge image;
         filling any holes within an area encapsulated by the defined edges to result in a hole-filled edge image;
         filling at least a portion of the area encapsulated by the defined edges in the hole-filled edge image in black to generate a filled with black image;
         converting the filled with black image to a binary image comprising solely black and white pixels;
         inverting the binary image to result in a complementary binary image;
         filtering out regions of pixels in the binary image having an area below a pre-defined threshold to result in a small regions filter image;
         inverting the small regions filter image and discarding connected regions of pixels identified in the inverted small regions filter image having an area below a pre-defined threshold to result in the discarded connected regions image; and
         inverting the discarded connected regions image and forming the at least one bounding polygon around the biggest connected region within the inverted discarded connected regions image.

2. The method of claim 1, wherein a shape of the at least one bounding polygon is rectangular.

3. The method of claim 1, wherein a shape of the at least one bounding polygon has three or more sides.

4. The method of claim 1, wherein the image color data is RGB data.

5. A system for enhanced object localization and object characterization within multi-dimensional image data comprising:
   at least one data processor;
   memory storing instructions which, when executed by the at least one data processor, result in operations comprising:
      receiving multi-dimensional, digital image color data for a field of view;
      performing color segmentation on the image color data to define at least one bounding polygon that minimizes an amount of free space within each bounding polygon, the color segmentation comprising a sequence including converting color images within the image color data into binary images, selectively inverting the binary images, and converting the binary images back into color images;
      cropping, using the at least one bounding polygon, the image color data to result in cropped image color data; and
      applying image processing to the cropped image color data to identify at least one object therein;
      wherein:
         selectively inverting the binary images comprises generating a discarded connected regions image and inverting the discarded connected regions image;
         the at least one bounding polygon is formed around a biggest connected region within the inverted discarded connected regions image; and
         the performing color segmentation comprises:
            cropping the image color data using the at least one bounding polygon to result in a cropped RGB image;
            performing color thresholding on the cropped RGB image to consolidate colors within pre-defined color ranges to result in a color threshold image;
            defining edges for the color threshold image to result in an edge image;
            filling any holes within an area encapsulated by the defined edges to result in a hole-filled edge image;
            filling at least a portion of the area encapsulated by the defined edges in the hole-filled edge image in black to generate a filled with black image;
            converting the filled with black image to a binary image comprising solely black and white pixels;
            inverting the binary image to result in a complementary binary image;

filtering out regions of pixels in the binary image having an area below a pre-defined threshold to result in a small regions filter image;

inverting the small regions filter image and discarding connected regions of pixels identified in the inverted small regions filter image having an area below a pre-defined threshold to result in the discarded connected regions image; and inverting the discarded connected regions image and forming the at least one bounding polygon around the biggest connected region within the inverted discarded connected regions image.

6. The system of claim 5, wherein a shape of the at least one bounding polygon has three or more sides.

7. A non-transitory computer program product for enhanced object localization and object characterization within multi-dimensional image data, the computer program product storing instructions which, when executed by at least one data processor forming part of at least one computing device, result in operations comprising:

receiving multi-dimensional, digital image color data for a field of view;

performing color segmentation on the image color data to define at least one bounding polygon that minimizes an amount of free space within each bounding polygon, the color segmentation comprising a sequence including converting color images within the image color data into binary images, selectively inverting the binary images, and converting the binary images back into color images;

cropping, using the at least one bounding polygon, the image color data to result in cropped image color data; and applying image processing to the cropped image color data to identify at least one object therein;

wherein the performing color segmentation comprises:
cropping the image color data using the at least one bounding polygon to result in a cropped RGB image;

performing color thresholding on the cropped RGB image to consolidate colors within pre-defined color ranges to result in a color threshold image;

defining edges for the color threshold image to result in an edge image;

filling any holes within an area encapsulated by the defined edges to result in a hole-filled edge image;

filling at least a portion of the area encapsulated by the defined edges in the hole-filled edge image in black to generate a filled with black image;

converting the filled with black image to a binary image comprising solely black and white pixels;

inverting the binary image to result in a complementary binary image;

filtering out regions of pixels in the binary image having an area below a pre-defined threshold to result in a small regions filter image;

inverting the small regions filter image and discarding connected regions of pixels identified in the inverted small regions filter image having an area below a pre-defined threshold to result in a discarded connected regions image; and inverting the discarded connected regions image and forming the at least one bounding polygon around a biggest connected region within the inverted discarded connected regions image.

8. The computer program of claim 7, wherein a shape of the at least one bounding polygon has three or more sides.

9. The computer program product of claim 7, wherein a shape of the at least one bounding polygon is rectangular.

10. The computer program product of claim 7, the color data is RGB data.

11. The system of claim 5, wherein a shape of the at least one bounding polygon is rectangular.

12. The system of claim 5, the color data is RGB data.

* * * * *